United States Patent
Ivans et al.

(10) Patent No.: US 12,428,148 B2
(45) Date of Patent: Sep. 30, 2025

(54) UNMANNED ROTORCRAFT WITH DUAL CARGO DOORS

(71) Applicant: Bell Textron Inc., Fort Worth, TX (US)

(72) Inventors: Steven R. Ivans, Ponder, TX (US); Berlin B. Benfield, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 550 days.

(21) Appl. No.: 17/558,307

(22) Filed: Dec. 21, 2021

(65) Prior Publication Data
US 2023/0192287 A1 Jun. 22, 2023

(51) Int. Cl.
*B64C 29/00* (2006.01)
*B64C 1/14* (2006.01)
*B64U 10/17* (2023.01)
*B64U 10/20* (2023.01)
*B64U 50/33* (2023.01)
*B64U 70/80* (2023.01)

(52) U.S. Cl.
CPC ........... *B64C 29/0033* (2013.01); *B64C 1/14* (2013.01); *B64C 1/1415* (2013.01); *B64C 29/00* (2013.01); *B64U 10/17* (2023.01); *B64U 10/20* (2023.01); *B64U 50/33* (2023.01); *B64U 70/80* (2023.01)

(58) Field of Classification Search
CPC ..... B64C 29/0033; B64C 1/1415; B64C 1/22; B64U 10/10; B64U 50/00; B64U 70/80
See application file for complete search history.

(56) References Cited

U.S. PATENT DOCUMENTS

| D153,314 S | * | 4/1949 | Piasecki | 244/17.23 |
| 2011/0139928 A1 | * | 6/2011 | Morris | B64U 10/11 244/3 |
| 2011/0226899 A1 | * | 9/2011 | Cazals | B64C 1/22 244/118.1 |
| 2016/0214701 A1 | * | 7/2016 | Probst | B64C 1/24 |
| 2022/0212775 A1 | * | 7/2022 | Tao | B64C 1/22 |

OTHER PUBLICATIONS

Wikipedia, "Lockheed C-5 Galaxy," 22 pages retrieved from the Internet on Dec. 15, 2021; https://en.wikipedia.org/wiki/Lockheed_C-5_Galaxy.
Wikipedia, "Sikorsky S-64 Skycrane," 7 pages retrieved from the Internet on Dec. 15, 2021; https://en.wikipedia.org/wiki/Sikorsky_S-64_Skycrane.

* cited by examiner

*Primary Examiner* — Kimberly S Berona
*Assistant Examiner* — Steven J Shur
(74) *Attorney, Agent, or Firm* — Akona IP PC (57) ABSTRACT

There is disclosed in one example an unmanned vertical lift aircraft, comprising: an airframe; a drive system configured for vertical takeoff and landing (VTOL); a power plant to power the drive system; and an internal cargo bay comprising a fore aperture and an aft aperture, the fore and aft apertures having dimensions substantially conforming to a cross section of the internal cargo bay, and the internal cargo bay comprising a substantially linear and open volume between the fore and aft apertures.

20 Claims, 10 Drawing Sheets

UNMANNED ROTORCRAFT WITH DUAL CARGO DOORS

TECHNICAL FIELD

This specification relates generally to rotary aircraft and more particularly, though not exclusively, to an unmanned rotorcraft with dual cargo doors.

BACKGROUND

Rotary aircraft, also known as rotorcraft, are a class of aircraft that use rotary blades for lift and/or forward flight. Rotorcraft may include helicopters, tiltrotor aircraft, and other similar aircraft that are powered by rotary systems. Rotorcraft may have electrical or mechanical drive systems and may be powered by fuel, such as petrochemical fuel or by batteries or a combination of the two.

SUMMARY

There is disclosed in one example an unmanned vertical lift aircraft, comprising: an airframe; a drive system configured for vertical takeoff and landing (VTOL); a power plant to power the drive system; and an internal cargo bay comprising a fore aperture and an aft aperture, the fore and aft apertures having dimensions substantially conforming to a cross section of the internal cargo bay, and the internal cargo bay comprising a substantially linear and open volume between the fore and aft apertures.

BRIEF DESCRIPTION OF THE DRAWINGS

To provide a more complete understanding of the present disclosure and features and advantages thereof, reference is made to the following description, taken in conjunction with the accompanying FIGURES, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the present specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this specification, the terms "forward," "aft," "inboard," and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect (s). The term "inboard" may refer to a location of a component that is within the fuselage of an aircraft and/or a spatial direction that is closer to or along a centerline of the aircraft relative to another component or component aspect (s), wherein the centerline runs in a between the front and the rear of the aircraft. The term "outboard" may refer to a location of a component that is outside the fuselage of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed.

OVERVIEW

One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

Unmanned rotorcraft provide opportunities for innovations and how rotorcraft are operated and in how they carry cargo. One advantage of an unmanned rotorcraft is that the rotorcraft does not have to carry one or more human pilots. If the average mass of a human pilot is approximately 200 pounds, then a human pilot reduces the cargo capacity of a rotorcraft by approximately 200 pounds. A human copilot would reduce the cargo capacity by another 200 pounds. Furthermore, human pilots and their various instruments, displays, and support functions take up space in the rotorcraft.

By eliminating the need for a human pilot, embodiments of the unmanned rotorcraft disclosed herein enable certain novel cargo configurations. For example, there are many manned aircraft that include a rear cargo ramp, such as the C-5, C-130, the V-22 Osprey, and others. Furthermore, a subset of these aircraft with rear ramps may also provide a hinged nosecone as in the C-5 Galaxy. The C-5 galaxy nose can be hinged up and out of the way so that front access is available to the cargo bay area of the aircraft.

However, manned aircraft with a nose that hinges upward for access to the cargo bay cannot fly in this configuration. These aircraft require a human pilot, and the addition of the human pilot requires the nose to be hinged downward so that the pilot can operate the aircraft. However, an unmanned rotorcraft does not suffer from this limitation. An unmanned rotorcraft may have a cargo bay with an aft doorway which may be lowered down to be used as a ramp. The unmanned rotorcraft may also include a fore doorway that can similarly be hinged downward to act as a ramp. This configuration provides full and open access to the cargo bay that lies between the two open doorways. Further advantageously, the rotorcraft can operate with both doorways open. Whereas a manned aircraft requires the nose to be lowered, an unmanned aircraft can takeoff, land, and fly with fore and aft doorways open. Indeed, in some embodiments, the fore and aft doorways may be extraneous and may be omitted altogether. This provides a semi-enclosed cargo space that is open at the fore and aft ends. One advantage of such a cargo space is it can be used to carry outsize cargo. For example, a rotorcraft may have a cargo bay that has a shorter length than a large object such as a telephone pole. In a traditional aircraft, the rotorcraft could not carry this telephone pole in its internal cargo bay or, at the very best, the telephone pole would need to be unbalanced with a large portion sticking out the aft end of an aircraft with a lowered ramp during operation. However, with an unmanned rotorcraft with both doors lowered (or optionally with no doors), the telephone pole may be balanced on its center of gravity at the center of gravity of the rotorcraft. The less material would then be sticking out of the fore and aft doorways, providing a more balanced carry configuration. A telephone pole is used here as an illustrative example of an object that may have difficulty fitting in a traditional rotorcraft, but many other such objects or cargo configurations are possible.

The unmanned rotorcraft described herein may also include fore and aft doors or hatches that operate in various configurations. For example, in the case where cargo fits completely within the cargo bay, the fore and aft door may be closed. This provides better aerodynamic characteristics and reduced drag for in-flight operation. During loading and unloading, the fore and aft doors may be completely lowered, such as by hydraulic or pneumatic actuators that lower them to the ground. This provides a ramp for easier loading and unloading of cargo. Furthermore, the use of both fore and aft doors provides easier access to cargo. For example, the cargo may not be a single large piece of cargo but may be numerous smaller pieces of cargo. In that case, cargo workers could load and unload the rotorcraft from both the fore and aft. Furthermore, if a desired object is at one end of the aircraft, there is no need to completely unload from the other end of the aircraft to reach the desired object. Furthermore, in some embodiments, the aft and fore doors may provide additional support. For example, the doors could be raised to a level base configuration where they are level or substantially level with the floor of the cargo bay. Returning to the example of a telephone pole, with the doors sitting level with the cargo bay, additional support in the form of additional flooring is provided for the cargo. This could be accomplished with electric motors, a pneumatic or hydraulic actuator with predesignated stops, or with physical stops such as pins or other stopping means that physically hold the doors in a level configuration during operation.

The unmanned rotorcraft of the present specification may be provided in numerous different configurations such as a single rotor configuration, a coaxial rotor configuration, a tiltrotor configuration, or a tandem rotor configuration by way of illustrative and nonlimiting examples. Other rotor and cargo configurations are possible.

Furthermore, the unmanned rotorcraft of the present specification may be autonomous or semiautonomous. In autonomous operation, the rotorcraft may be given simply a designated flight plan and is expected to execute the flight plan without additional human intervention. In semiautonomous operation, the rotorcraft may be programmed in real-time or near real-time with waypoints or with gross controls such as a desired altitude, heading, and airspeed, which do not require detailed human input during semiautonomous operation.

Embodiments of the unmanned rotorcraft described herein may also provide a plurality of different drive mechanisms. For example, in one embodiment, the unmanned rotorcraft may have a purely mechanical drive system, such as one that burns jet fuel to operate a driveshaft to turn the rotors. Alternatively, the system could be purely electrical, such as a battery-powered rotorcraft with an electric motor. In yet another embodiment, a hybrid rotorcraft configuration may be provided, such as one wherein a mechanical engine burns fuel, such as petrochemical fuel, which provides instantaneous power to a generator. The generator may then be used to provide electrical power to one or more electric motors that drive the rotors of the rotorcraft. This configuration may realize benefits in that the hybrid system may have a direct and short connection between the mechanical engine and the electric generator. Power can then be distributed throughout the aircraft via small and lightweight electrical conductors instead of larger and heavier driveshafts and other mechanical elements.

DESCRIPTION OF THE DRAWINGS

A system and method for providing predictive preconditioning of an electric aircraft battery system will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

Figure 1:
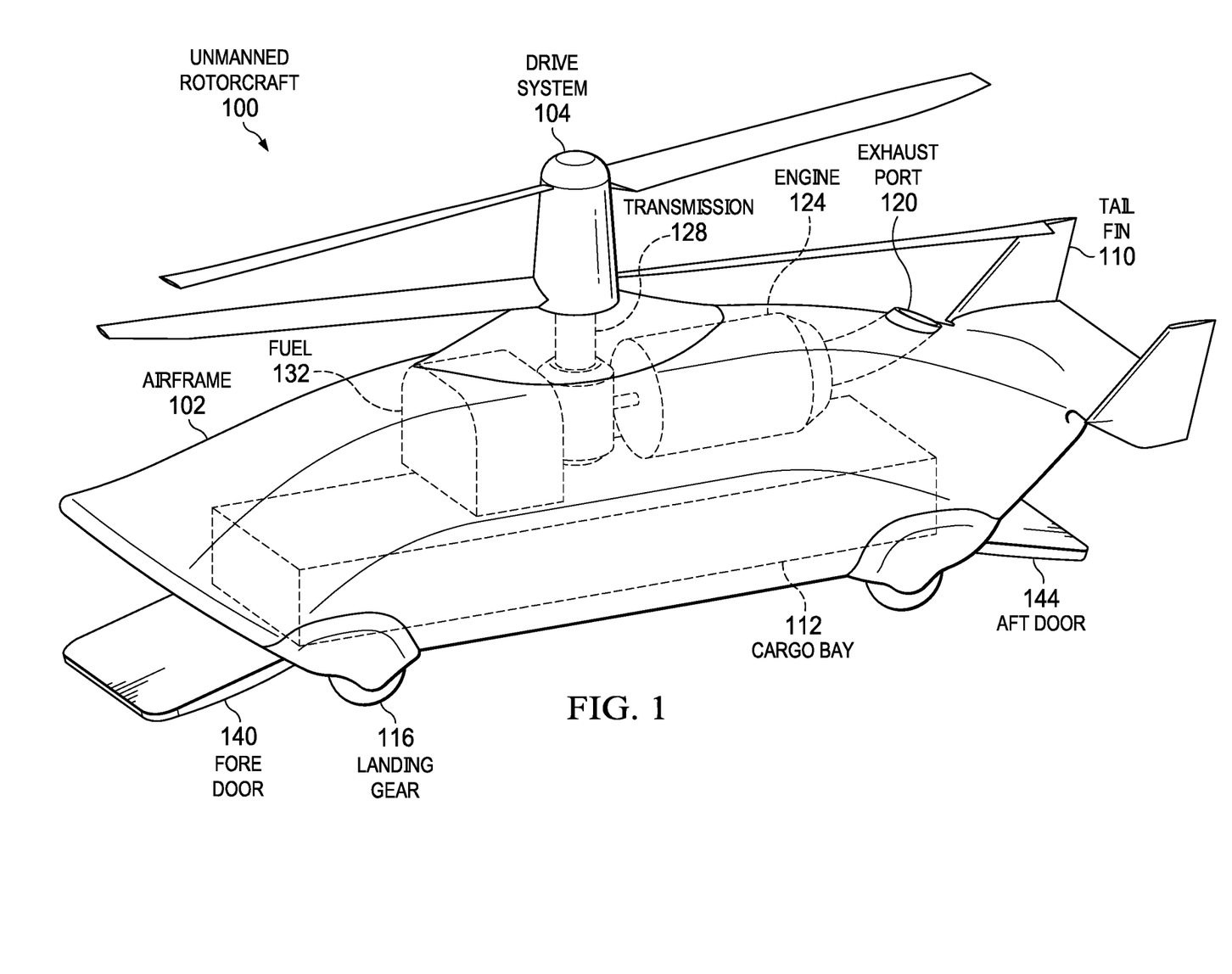
FIG. 1 is a cutaway perspective view illustration of selected elements of an unmanned rotorcraft.

FIG. 1 is a cutaway perspective view illustration of selected elements of an unmanned rotorcraft 100. Unmanned rotorcraft 100 may represent any of the unmanned rotorcraft disclosed throughout this specification, and the elements illustrated in FIG. 1 may be adapted to the other rotorcraft illustrated.

In this example, unmanned rotorcraft 100 includes an airframe 102. Airframe 102 may provide mechanical and structural support for the overall rotorcraft 100 and may also provide a useful enclosure for internal components. Airframe 102 may include an open cargo bay 112. Cargo bay 112 may include open space wherein cargo may be loaded and may also include other features, such as features for mounting or securing cargo. Cargo bay 112 terminates at fore door 140 and aft door 144. As illustrated herein, cargo bay 112 may provide a straight and unobstructed pathway between fore door 140 and aft door 144. Thus, cargo may be loaded from either the fore or aft end of unmanned rotorcraft 100 or unloaded from either the fore or aft end of unmanned rotorcraft 100. Furthermore, because rotorcraft 100 is unmanned, there is no cockpit with a human operator and human instruments. This may effectively increase the cargo carrying capacity of unmanned rotorcraft 100 by approximately the amount that would be consumed by the human pilot or pilots and their instruments.

Unmanned rotorcraft 100 sits on landing gear 116. Wheels are shown here as landing gear 116, but other landing gear may be provided such as feet, skids, skis, pontoons, or other for different types of operation. In some cases, landing feet may be provided (as illustrated, for example, in FIG. 7) with a modular landing gear system that may accept different types of landing gear, such as feet, wheels, skids, skis, pontoons, or other.

Unmanned rotorcraft 100 includes a drive system 104 which, in this illustration, is shown as a coaxial drive system although other drive systems are illustrated throughout this specification. Unmanned rotorcraft 100 also includes a tail fin 110 which, in this illustration, is a wing and fin configuration but may be in other configurations and on other rotorcraft throughout this specification.

Unmanned rotorcraft 100 includes. in this example. a mechanical power plant, including an engine 124, which vents exhaust through exhaust port 120. Engine 124 turns a driveshaft, which includes a transmission 128 that operates drive system 104. Engine 124 may be fueled by fuel tank 132.

As described above, other power plants are also possible including electrical power plants and a hybrid configuration.

Figure 2A:
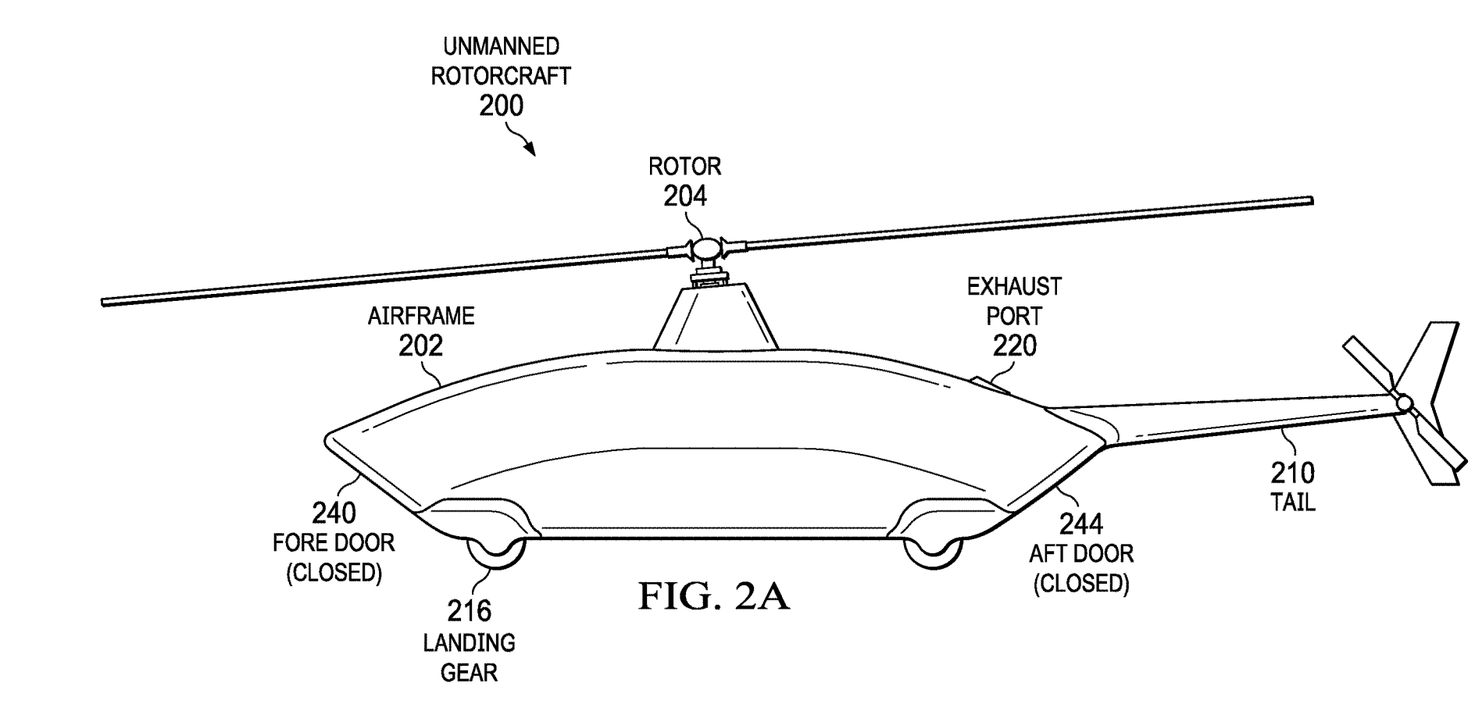
FIG. 2A provides a side view illustration of unmanned rotorcraft.
Figure 2B:
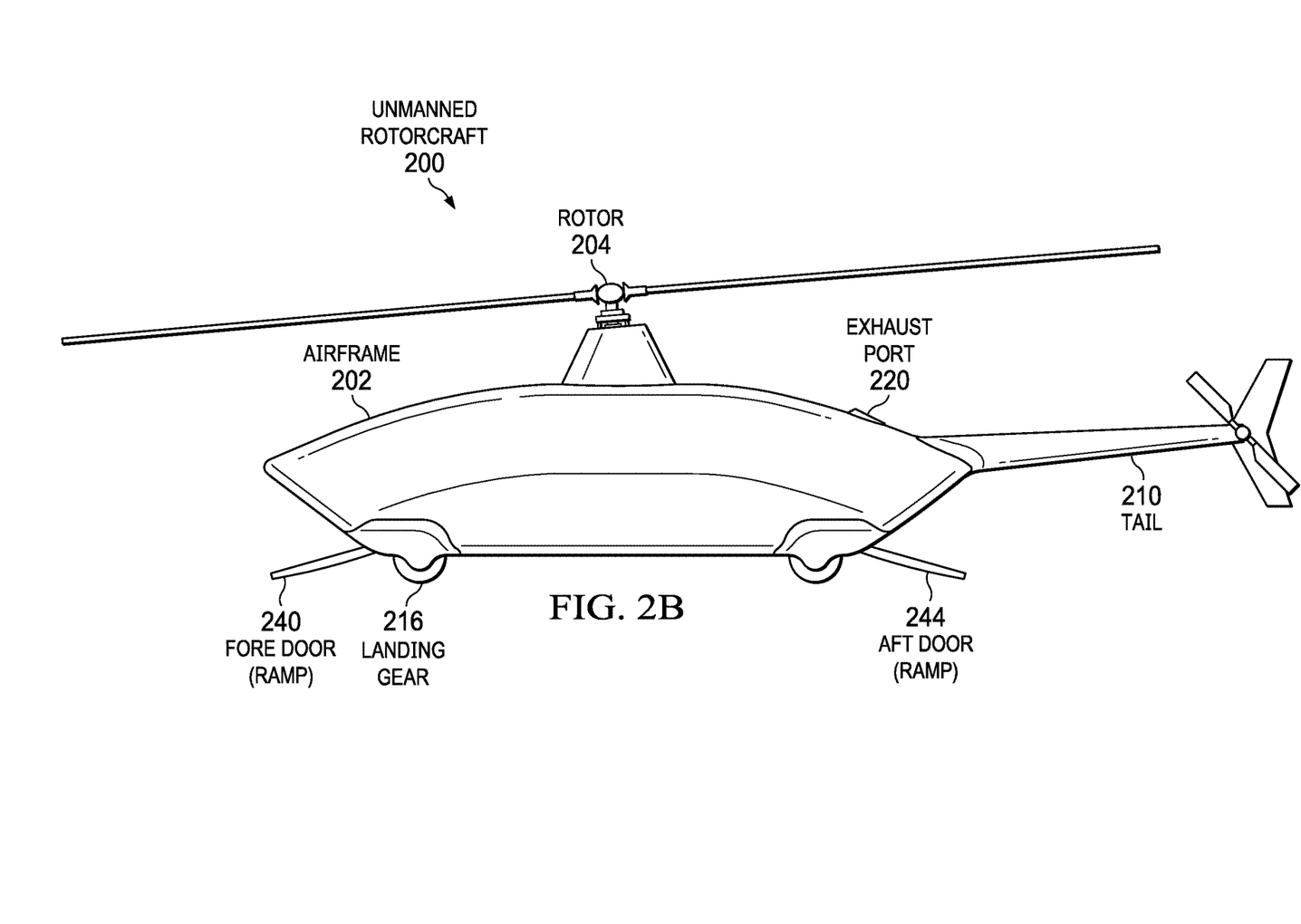
FIG. 2B provides an alternative side view illustration of unmanned rotorcraft.
Figure 3:
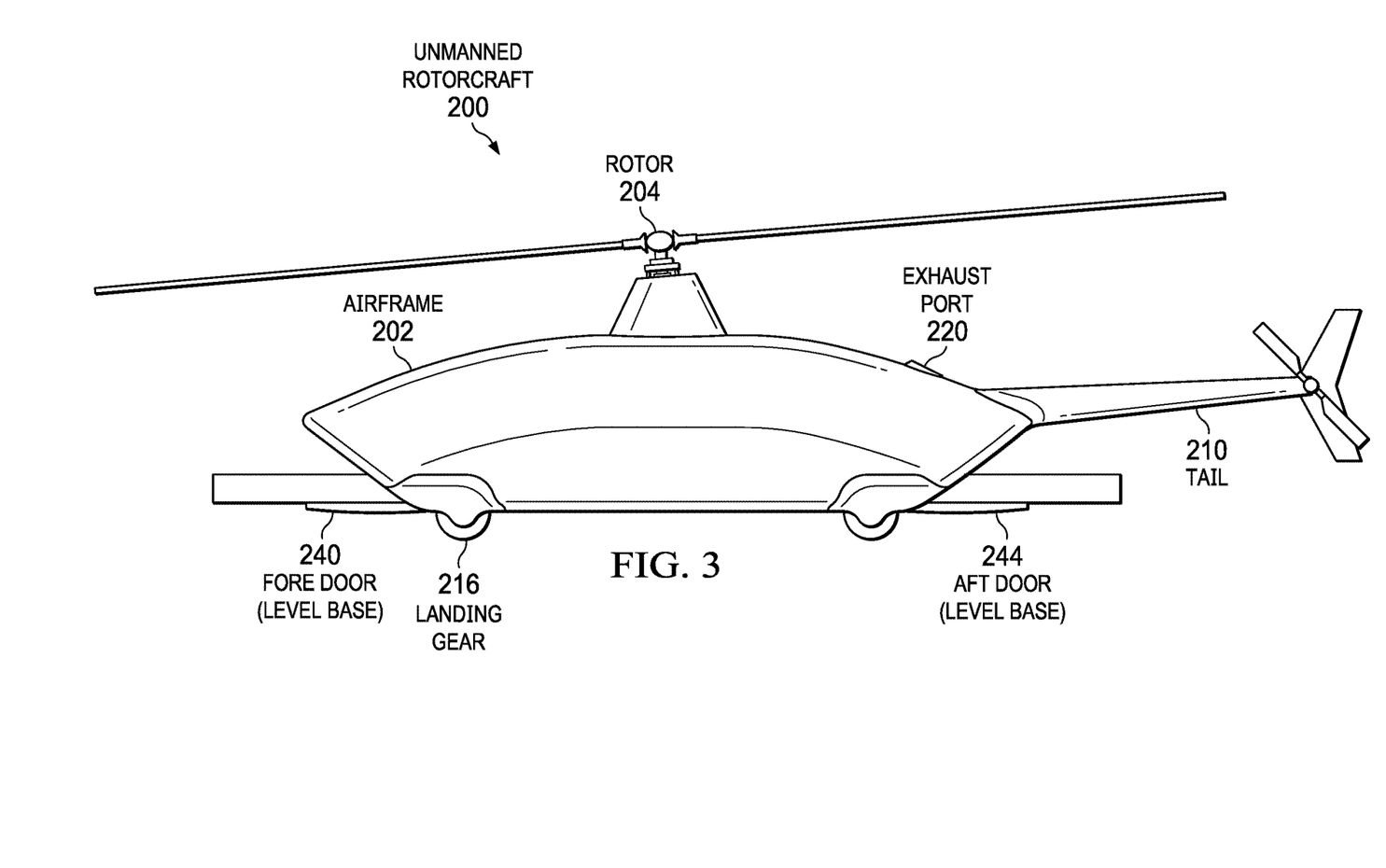
FIG. 3 is a side view illustration of a live cargo configuration of unmanned rotorcraft.

FIGS. 2A, 2B, and 3 illustrate various cargo configurations of an unmanned rotorcraft 200. Unmanned rotorcraft 200 may be an embodiment or an example of an unmanned rotorcraft, such as unmanned rotorcraft 100 of FIG. 1, and relevant teachings of FIG. 1 may be understood to apply equally to FIGS. 2A, 2B, and 3.

Unmanned rotorcraft 200 is illustrated as a single rotor configuration with a single rotor 204. Unmanned rotorcraft 200 also includes an airframe 202, which provides mechanical and structural support, a tail 210, and landing gear 216. Unmanned rotorcraft 200 may also include a power plant which may vent exhaust through exhaust port 220.

Unmanned rotorcraft 200 includes an internal cargo bay that is not visible in this view but that is terminated by a fore door 240 and aft door 244. In this illustration, fore door 240 and aft door 244 are closed so that they are not visible in this side view. This provides a secure and enclosed cargo bay.

FIG. 2B provides an alternative side view illustration of unmanned rotorcraft 200. In the illustration of FIG. 2B, unmanned rotorcraft 200 includes airframe 202, rotor 204, exhaust port 220, tail 210, and landing gear 216. As before, unmanned rotorcraft 200 includes an internal cargo bay terminated by a fore door 240 and an aft door 244. In this illustration, fore door 240 and aft door 244 are in a ramp configuration wherein they are lowered to the ground to provide easier loading and unloading of cargo. With the doors in the ramp configuration, wheeled vehicles may be used to load and unload cargo, and it may be easier for a human to load cargo into or out of the cargo bay.

FIG. 3 is a side view illustration of a live cargo configuration of unmanned rotorcraft 200. In this example, unmanned rotorcraft 200 includes rotor 204, airframe 202, exhaust port 220, tail 210, and landing gear 216. Fore door 240 and aft door 244 are also illustrated and are in a level base configuration. The level base configuration may be reached by using hydraulic or pneumatic actuators or an electric motor to raise from the ramp position to the level base configuration. Alternatively, mechanical stops, pins, or other securing means could be used to secure fore door 240 and aft door 244 in the level base position. A cargo load 248 is inserted into the cargo bay of unmanned rotorcraft 200. By way of illustration, cargo load 248 could be a telephone pole that is somewhat longer than an internal length of the cargo bay. However, with fore door 240 and aft door 244 open, cargo load 248 can be securely positioned within unmanned rotorcraft 200. Advantageously, unmanned rotorcraft 200 does not have a human pilot and so can operate with both fore door 240 and aft door 244 open. Furthermore, with the doors in the level base configuration, they provide additional structural support to cargo load 248. Further advantageously, because the oversized cargo load can protrude from both ends of unmanned rotorcraft 200, the center of gravity of cargo load 248 can more easily be positioned at approximately the center of gravity of rotorcraft 200. This may help to ensure more stable flight and better distribute the load of cargo load 248.

Figure 4:
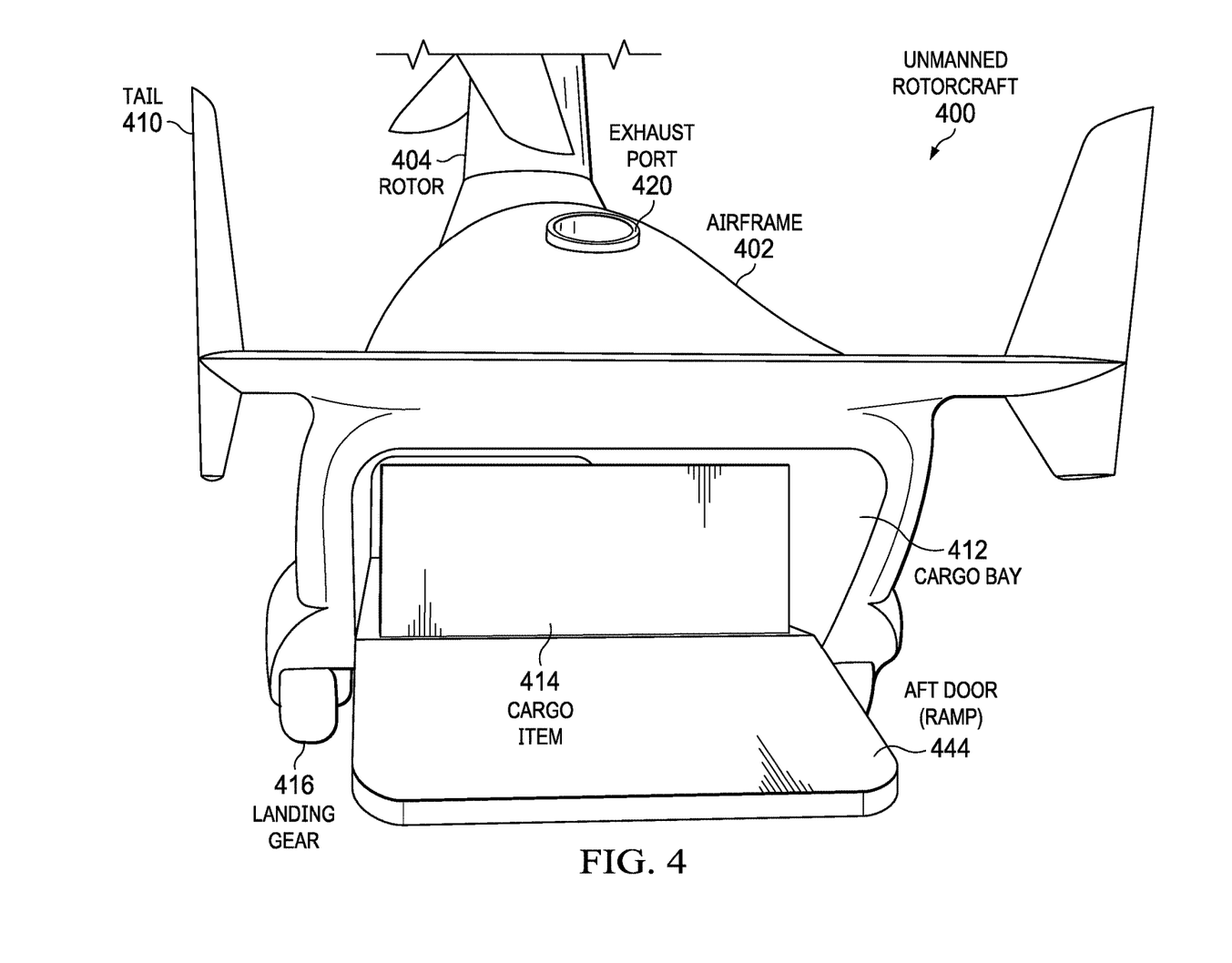
FIG. 4 is a rear view of selected elements of an unmanned rotorcraft.

FIG. 4 is a rear view of selected elements of an unmanned rotorcraft 400. Unmanned rotorcraft 400 may be an instance or an example of unmanned rotorcraft 100 of FIG. 1, and the teachings of FIG. 1 should be understood to apply to unmanned rotorcraft 400 as well. In this example, unmanned rotorcraft 400 includes an airframe 402, a rotor system 404, an exhaust port 420, a tail 410, and landing gear 416. Visible in FIG. 4 is a cargo bay 412, which is open and visible with aft door 444 in a ramp configuration. A fore door is also provided to unmanned rotorcraft 400 but is not visible in this rear view. However, the fore door of unmanned rotorcraft 400 is also open, and thus both ends of cargo bay 412 are open. A cargo item 414 is visible within cargo bay 412. As discussed, cargo item 414 may be more easily loaded or unloaded with both fore and aft doors open to provide a single pass-through cargo bay. Furthermore, if cargo item 414 is a long cargo item that does not fit fully within the length of cargo bay 412, then cargo item 414 may be allowed to protrude from cargo bay 412 at both the fore and aft. In some cases, if an extra-long cargo item 414 is carried, then aft door 444 may be partially raised from the ramp position to a level base configuration. The unseen fore door may also be raised to this configuration.

FIGS. 5, 6, 7, and 8 provide illustrations of additional options for an unmanned rotorcraft. The teachings of FIGS. 1 through 4 should be understood to apply to FIGS. 5 through 8 where those teachings are applicable.

Figure 5:
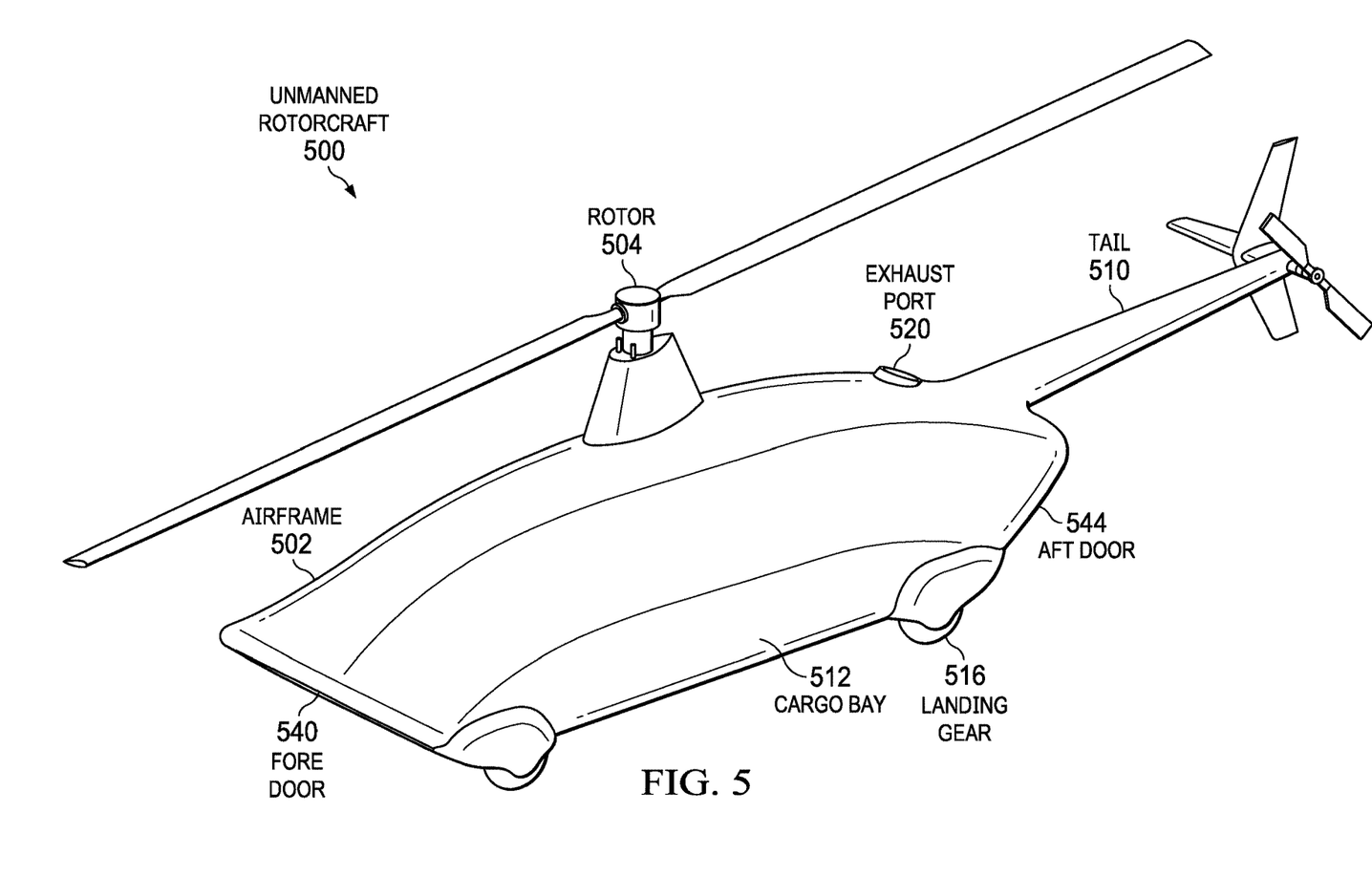
FIG. 5 is a perspective view of an unmanned rotorcraft.

FIG. 5 is a perspective view of an unmanned rotorcraft 500. Unmanned rotorcraft 500 is a single rotor rotorcraft within airframe 502 in a simple fuselage configuration. Airframe 502 defines an internal cargo bay 512, which includes a fore door 540 and aft door 544. As in other FIGURES, fore door 540 and aft door 544 may be raised, lowered, or partially raised both for loading, unloading, and during flight operation of unmanned rotorcraft 500. Unmanned rotorcraft 500 also includes an internal power plant, which may vent exhaust through exhaust port 520 and drives a single rotor system 504. Note that any of the rotors illustrated throughout this specification may include any suitable number of rotor blades, such as two blades, three blades, four blades, five blades, six blades, or some other number of blades.

Figure 6:
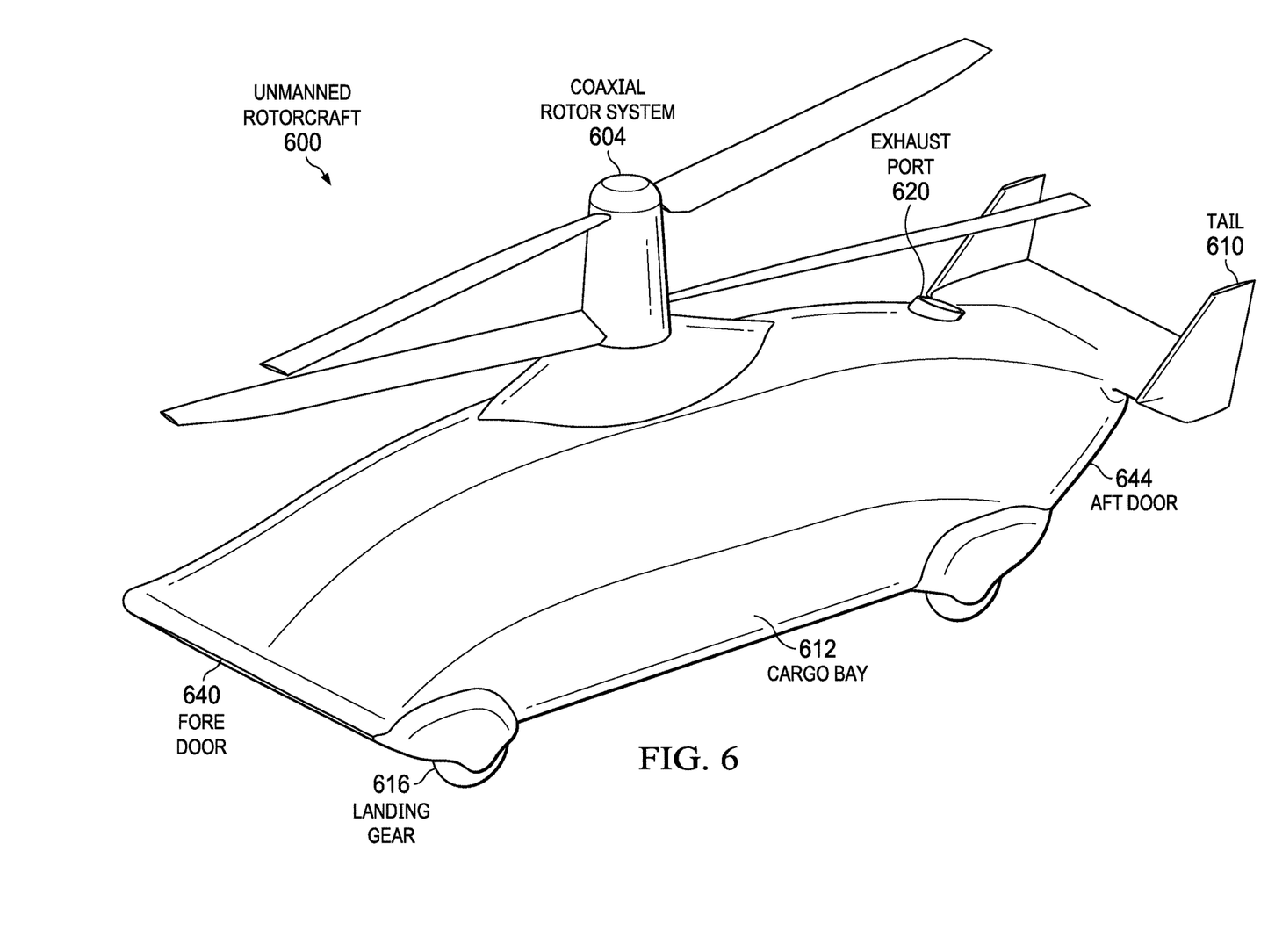
FIG. 6 is a perspective view of an unmanned rotorcraft.

FIG. 6 is a perspective view of an unmanned rotorcraft 600. Unmanned rotorcraft 600 includes a coaxial rotor system 604. Coaxial rotor system 604 includes two different rotors that turn in opposite directions, thus providing more stable torques on unmanned rotorcraft 600. Unmanned rotorcraft 600 in this example includes a tail 610 that is in a wing and tail configuration rather than a traditional helicopter tail. Unmanned rotorcraft 600 may include an internal power plant which optionally may exhaust the exhaust port 620. Unmanned rotorcraft 600 also rests on landing gear 616.

Unmanned rotorcraft 600 includes an internal cargo bay 612 which terminates at fore door 640 and aft door 644. As throughout other illustrations in this specification, fore door 640 and aft door 644 may be in a raised, lowered, or semi-raised position for loading, unloading, and during flight operation.

Figure 7:
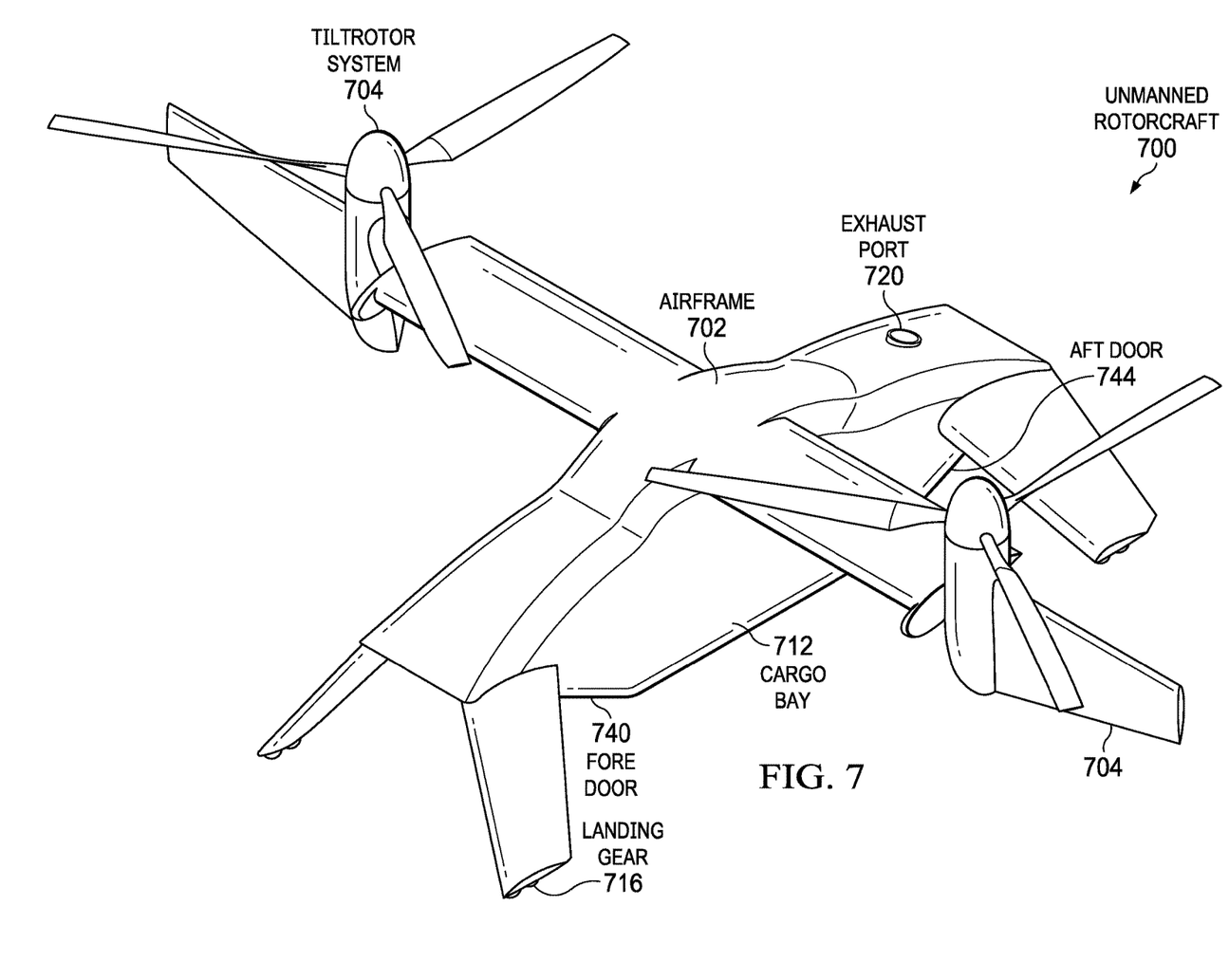
FIG. 7 is a perspective view of an unmanned rotorcraft.

FIG. 7 is a perspective view of an unmanned rotorcraft 700. Unmanned rotorcraft 700 is provided in a tiltrotor configuration. This includes a tiltrotor system 704, which includes two tiltrotor drives which can be in a first orientation for vertical takeoff and landing operations and then moved approximately 90 degrees to a forward configuration for level flight operations. This is similar to the V-22 Osprey aircraft.

As before, unmanned rotorcraft 700 includes an airframe 702 and an internal power plant which may optionally exhaust through exhaust port 720. Landing gear 716 provide landing for unmanned rotorcraft 700 and, in this configuration, are illustrated as landing feet.

Unmanned rotorcraft 700 includes an internal cargo bay 712 with a fore door 740 and an aft door 744. Fore door and aft door 744 may be raised, lowered, or semi-raised at different times during operation, such as for loading, unloading, and during flight.

Figure 8:
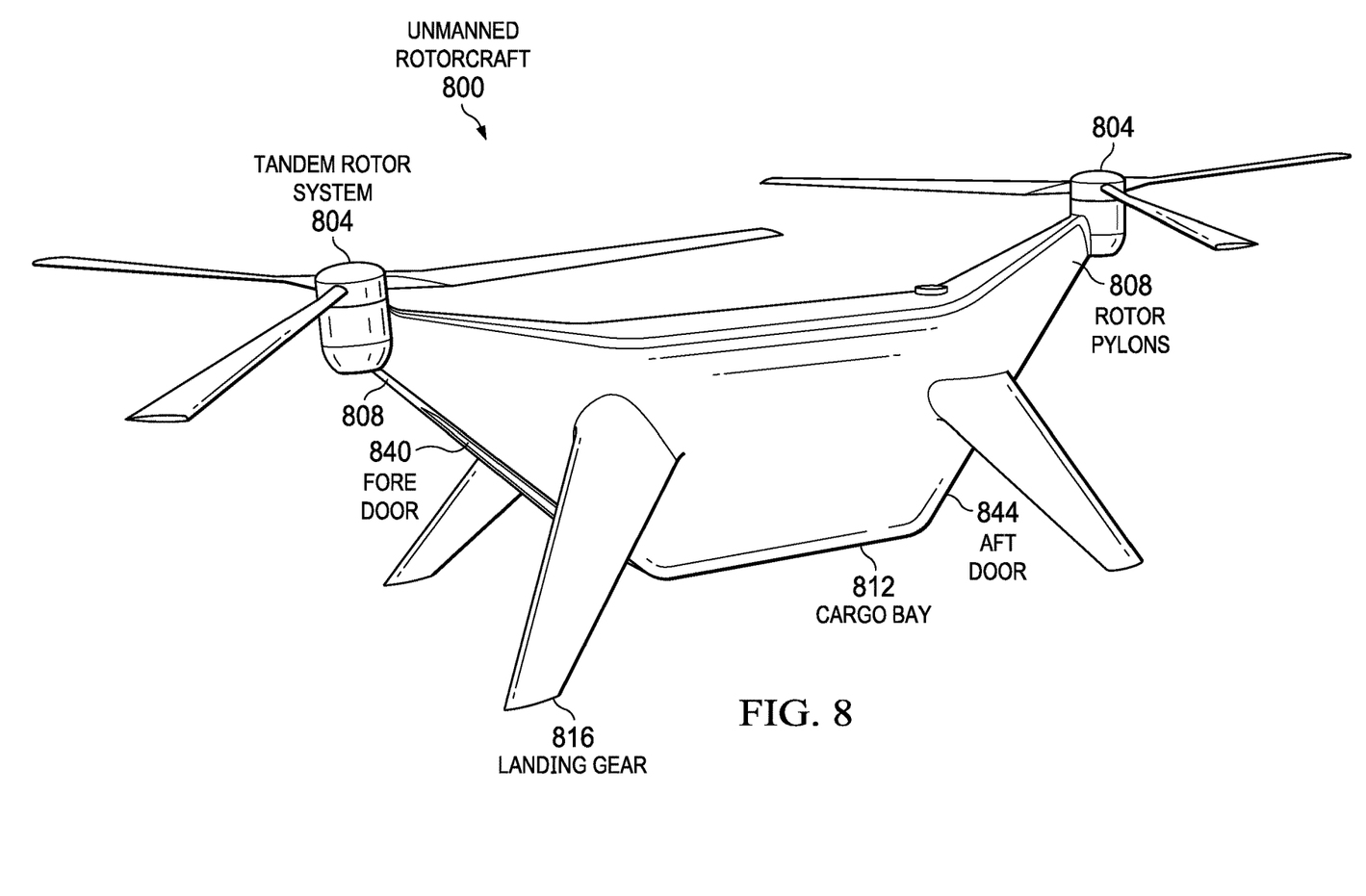
FIG. 8 is a perspective view of an unmanned rotorcraft.

FIG. 8 is a perspective view of an unmanned rotorcraft 800. Unmanned rotorcraft 800 is in a tandem rotor configuration. In this example, unmanned rotorcraft 800 includes a tandem rotor system 804, which includes fore and aft rotors 804. Fore and aft rotors 804 provide for advantages, such as better control of torque and increased options for rotorcraft center of gravity. For example, if the rotorcraft center of gravity shifts because the cargo shifts, then tandem rotors 804 may compensate with changes in torque. Furthermore, tandem rotors 804 may be mounted on respective rotor pylons 808. In this illustration, rotor pylons 808 provide a relatively small profile to rotors 804 and are relatively aerodynamic. This may realize advantages, such as by decreasing the download force on rotor pylons 808 when rotors 804 are operating. Furthermore, if unmanned rotorcraft 800 is in a hybrid power plant configuration, then rotor pylons 808 may be even further reduced in size because there may be no need to run driveshafts to rotors 804. Rather, rotors 804 may be driven by electric motors which can be powered by relatively small electrical conductors from the electric generator.

Unmanned rotorcraft 800 includes landing gear 816 which, in this illustration, is shown as a feet configuration. Other landing gear could also be provided.

Unmanned rotorcraft 800 includes an internal cargo bay 812 with fore and aft doors 840, 844. As in other illustrations, fore door 840 and aft door 844 may include doors that can be raised, lowered, or semi-raised in various phases of operation, including during loading, unloading, and during flight.

Figure 9:
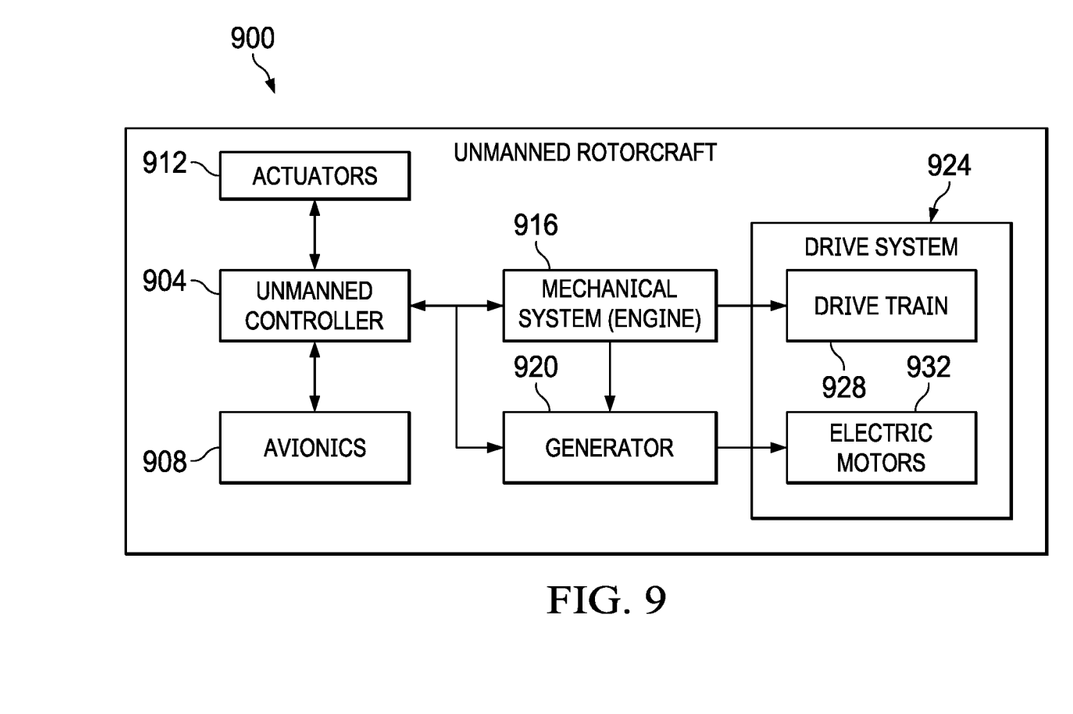
FIG. 9 is a block diagram of selected elements of an unmanned rotorcraft.

FIG. 9 is a block diagram illustration of selected elements of an unmanned rotorcraft 900. Unmanned rotorcraft 900 includes an unmanned controller 904. An unmanned controller 904 may be configured for autonomous or semiautonomous configuration. For example, in a semiautonomous configuration, unmanned controller 904 may receive gross command inputs, which indicate, for example, a direction, an airspeed, an altitude, or other desired functionality. In that case, unmanned controller 904 may still need to perform calculations to carry out these instructions. In a fully autonomous configuration, unmanned controller 904 may simply be programmed with a predesignated flight plan, and unmanned controller 904 may have responsibility for fully carrying out the designated flight plan.

In performing calculations and computations, unmanned controller 904 may receive inputs from avionics 908. Avionics 908 may include various sensors, transducers, and other data that provide unmanned controller 904 with information about the aircraft, its operating condition, the outside condition, and other factors. This can include traditional avionics, such as roll, pitch, yaw, outside air temperature, rotor speed, temperature sensors, synchro resolvers, and other information that may be useful for unmanned controller 904 to make decisions about operation of rotorcraft 900. Unmanned controller 904 may then use this information to drive actuators 912, which may be coupled to control surfaces of the aircraft, to control roll, pitch, yaw, altitude, rotor speed, and other factors that effect the desired flight path of the rotorcraft. For example, actuators 912 may be mechanically and communicatively coupled to a driveshaft, to a collective controller, or to airfoil surfaces.

Unmanned controller 904 may have access to a mechanical system, such as an engine 916. Mechanical system 916 may include, for example, a chemical or petrochemical engine that operates by burning or exhausting fuel. In some cases, mechanical system 916 may directly drive a drivetrain 926, which is part of a drive system 924.

In the same or a different embodiment, at least partial electrical control may be provided. In that case, mechanical system 916 could provide instantaneous power to a generator 920, which provides electrical power to electric motors 932. Electric motors 932 may also be used to drive rotors and provide power to the aircraft. In some cases, a mechanical drivetrain 928 may be omitted and the system may be powered directly by electric motors 932. In other cases, electric motors 932 may be omitted and the system may be powered purely by a drivetrain 928. In yet other examples, some mechanical systems may be driven by drivetrain 928, and others may be driven by electric motors 932. Furthermore, in some cases, mechanical system 916 could be omitted, and instead, batteries or other alternative power sources could provide power to generator 920.

DESIGN VARIATIONS AND RANGES

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

SELECTED EXAMPLES

The teachings of the present specification may be understood in terms of various examples, as follows.

There is disclosed in an example, wherein an unmanned vertical lift aircraft, comprising: an airframe; a drive system configured for vertical takeoff and landing (VTOL); a power plant to power the drive system; and an internal cargo bay comprising a fore aperture and an aft aperture, the fore and aft apertures having dimensions substantially conforming to a cross section of the internal cargo bay, and the internal cargo bay comprising a substantially linear and open volume between the fore and aft apertures.

There is further disclosed an example wherein the drive system comprises a single main rotor.

There is further disclosed an example wherein the drive system comprises a plural coaxial rotor system.

There is further disclosed an example wherein the drive system comprises a tandem rotor system.

There is further disclosed an example wherein the drive system comprises a tiltrotor system.

There is further disclosed an example wherein the power plant comprises a mechanical power plant.

There is further disclosed an example wherein the power plant comprises an electrical power plant.

There is further disclosed an example wherein the power plant comprises a hybrid-electric power plant.

There is further disclosed an example further comprising an autonomous vehicle controller.

There is further disclosed an example further comprising a semi-autonomous vehicle controller.

There is further disclosed an example further comprising fore and aft doors for the fore and aft apertures.

There is further disclosed an example wherein the fore and aft doors lower to fore and aft loading ramps.

There is further disclosed an example of an unmanned aerial vehicle (UAV) comprising: a rotary drive system to provide vertical cargo lift; and a cargo bay having a length substantially equal to a longitudinal length of the UAV, a width substantially equal to a lateral width of the UAV, and having front and rear apertures with front and rear doors respectively, whereby a cargo object may rest within the cargo bay protruding simultaneously from the front and rear apertures with the front and rear doors open.

There is further disclosed an example wherein the rotary drive system comprises a single main rotor.

There is further disclosed an example wherein the rotary drive system comprises a plural coaxial rotor system.

There is further disclosed an example wherein the rotary drive system comprises a tandem rotor system.

There is further disclosed an example wherein the rotary drive system comprises a tiltrotor system.

There is further disclosed an example further comprising a mechanical power plant.

There is further disclosed an example further comprising an electrical power plant.

There is further disclosed an example further comprising a hybrid-electric power plant.

There is further disclosed an example further comprising an autonomous vehicle controller.

There is further disclosed an example further comprising a semi-autonomous vehicle controller.

There is further disclosed an example wherein the front and rear doors lower to front and rear loading ramps.

There is further disclosed an example of a cargo hold for an unmanned rotorcraft, the cargo hold enclosed on four sides, and open on two sides, wherein a pass through space is defined between the two open sides, wherein a cargo piece may occupy the pass through space with the two open sides open during flight operations of the unmanned rotorcraft.

There is further disclosed an example wherein the cargo hold is a fixed member of the unmanned rotorcraft.

There is further disclosed an example wherein the cargo hold is a detachable cargo container.

There is further disclosed an example further comprising respective doors for the two open sides.

There is further disclosed an example wherein the respective doors lower to respective loading ramps.

What is claimed is:

1. An unmanned vertical lift aircraft, comprising:
    an airframe;
    a drive system configured for vertical takeoff and landing (VTOL);
    a power plant to power the drive system;
    an internal cargo bay comprising a fore aperture through a forward end of the airframe and an aft aperture through an aft end of the airframe opposite the forward end and separated from the fore aperture by a length of the cargo bay, the fore and aft apertures having dimensions substantially conforming to a cross section of the internal cargo bay, and the internal cargo bay comprising a substantially linear and open volume between the fore and aft apertures; and
    a fore door associated with the fore aperture and an aft door associated with the aft aperture;
    wherein each of the fore and aft doors are selectively and fixedly positionable in a ramp configuration and in a level base configuration; and
    wherein the unmanned vertical lift aircraft is configured to fly with at least one of the fore and aft doors fixedly positioned in the level base configuration such that cargo may extend from the cargo bay through at least one of the fore and aft apertures during flight, the at least one of the fore and aft doors providing support for the cargo extending from the cargo bay.

2. The unmanned vertical lift aircraft of claim 1, wherein the drive system comprises a single main rotor.

3. The unmanned vertical lift aircraft of claim 1, wherein the drive system comprises a plural coaxial rotor system.

4. The unmanned vertical lift aircraft of claim 1, wherein the drive system comprises a tandem rotor system.

5. The unmanned vertical lift aircraft of claim 1, wherein the drive system comprises a tiltrotor system.

6. The unmanned vertical lift aircraft of claim 1, wherein the power plant comprises a mechanical power plant.

7. The unmanned vertical lift aircraft of claim 1, wherein the power plant comprises an electrical power plant.

8. The unmanned vertical lift aircraft of claim 1, wherein the power plant comprises a hybrid-electric power plant.

9. The unmanned vertical lift aircraft of claim 1, further comprising an autonomous vehicle controller.

10. The unmanned vertical lift aircraft of claim 1, further comprising a semi-autonomous vehicle controller.

11. The unmanned vertical lift aircraft of claim 1, further comprising fore and aft doors for the fore and aft apertures.

12. The unmanned vertical lift aircraft of claim 11, wherein the fore and aft doors lower to fore and aft loading ramps.

13. An unmanned aerial vehicle (UAV) comprising:
    a rotary drive system to provide vertical cargo lift;
    a cargo bay having a length substantially equal to a longitudinal length of the UAV and a width substantially equal to a lateral width of the UAV, and including a front aperture through a front end of the UAV and a rear aperture through a rear end of the UAV opposite the front end of the UAV, the front and rear apertures separated by at least a portion of the longitudinal length of the UAV and including front and rear doors, respectively,
    wherein a cargo object within the cargo bay is supported on a bottom surface of the cargo bay such that opposite ends of the cargo object protrude simultaneously from the front and rear apertures with the front and rear doors open and fixed in a level base configuration during airborne operation of the UAV.

14. The UAV of claim 13, wherein the rotary drive system comprises a single main rotor.

15. The UAV of claim 13, wherein the rotary drive system comprises a plural coaxial rotor system or a tandem rotor system.

16. The UAV of claim 13, wherein the front and rear doors lower to front and rear loading ramps.

17. A cargo hold for an unmanned rotorcraft, the cargo hold enclosed on four sides, and open on two sides, wherein the two open sides are disposed at opposite ends of a longitudinal length of the cargo hold and doors associated with the open sides, wherein a pass through space is defined between the two open sides, and wherein a cargo piece may occupy the pass through space with the two open sides open and the doors fixedly positioned in a level base configuration to provide support to the cargo piece during airborne operation of the unmanned rotorcraft.

18. The cargo hold of claim 17, wherein the cargo hold is a fixed member of the unmanned rotorcraft.

19. The cargo hold of claim 17, wherein the cargo hold is a detachable cargo container.

20. The cargo hold of claim 17, further comprising respective doors for the two open sides, wherein the respective doors lower to respective loading ramps.

* * * * *